(12) United States Patent
Mohindra et al.

(10) Patent No.: US 6,816,881 B1
(45) Date of Patent: Nov. 9, 2004

(54) METHOD AND APPARATUS FOR INTER-APPLICATION COMMUNICATION IN WIRELESS NETWORKS

(75) Inventors: Ajay Mohindra, Yorktown Heights, NY (US); Apratim Purakayastha, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,894

(22) Filed: Mar. 13, 2000

(51) Int. Cl.$^7$ .............................................. G06F 15/16
(52) U.S. Cl. ...................... 709/203; 709/200; 709/245; 455/414
(58) Field of Search ............................... 709/203, 245, 709/200, 201; 455/414

(56) References Cited

U.S. PATENT DOCUMENTS

| | | | | | |
|---|---|---|---|---|---|
| 4,430,755 A | * | 2/1984 | Nadir et al. | ................... | 455/77 |
| 5,317,621 A | * | 5/1994 | Shibayama | ................... | 379/57 |
| 5,522,077 A | * | 5/1996 | Cuthbert et al. | ............ | 395/700 |
| 5,561,702 A | * | 10/1996 | Lipp et al. | ..................... | 379/57 |
| 5,701,418 A | * | 12/1997 | Luitje | ........................ | 709/245 |
| 5,732,282 A | * | 3/1998 | Provino et al. | ............. | 395/830 |

OTHER PUBLICATIONS

S. Khanna et al., "On Broadcast Disk Paging," ACM, pp. 634–643, 1998.
D. Gelernter, "Generative Communication in Linda," ACM Transactions on Programming Languages and Systems, vol. 7, No. 1, pp. 80–112, Jan. 1985.
"JavaSpaces Specification," http://java.sun.com/products/javaspaces/specs/js.pdf, Sun Miocrosystems, 36 pages, Jul. 1998.
P. Wyckoff et al., "T Spaces," http://www.research.ibm.com/journal/sj/373/wyckoff.html, The IBM Systems Journal, 29 pages, Aug. 1998.
"MQSeries: Message Oriented Middleware," http://www-4.ibm.com/software/ts/mqseries/library/whitepapers/mqover, 6 pages, printed on Mar. 14, 2000.
"Castanet Infrastructure Suite," http://www.marimba.com/products/resource.htm, Marimba, 7 pages, printed on Mar. 14, 2000.
J.X. Yu et al., "An Analysis of Selective Tuning Schemes for Nonuniform Broadcast," Data & Knowledge Engineering, vol. 22, No. 3, pp. 319–344, May 1997.
S. Zdonick et al., "Are "Disks in the Air" Just Pie in the Sky,?" IEEE Workshop on Mobile Computing Systems and Applications, pp. 1–8, Dec 1994.
B. Bhargava et al., "Digital Library Services in Mobile Computing," SIGMOD Record, vol. 24, No. 4, pp. 34–39, 1995.
D. Barbará et al., "Sleepers and Workaholics: Caching Strategies in Mobile Environments," SIGMOD, vol. 23, No. 2, pp. 1–12, Jun. 1994.

(List continued on next page.)

*Primary Examiner*—Hosain Alam
*Assistant Examiner*—Liang-che Alex Wang
(74) *Attorney, Agent, or Firm*—Louis P. Herzberg; Ryan, Mason & Lewis, LLP (57) ABSTRACT

A method for providing inter-application communication between a sending device and one or more receiving devices in a wireless network comprises the steps of: (i) at the sending device, tagging a data item with an identifier unique to an intended communication between the sending device and the one or more receiving devices; (ii) at the sending device, broadcasting the tagged data item in the wireless network; (iii) at a receiving device, receiving the broadcast data item when the receiving device is within a radio-range of the sending device; and (iv) at a receiving device, accepting the data item for processing when the identifier substantially matches an identifier expected by an application associated with the receiving device; wherein the sending device and the receiving device need not be aware of each other's presence.

19 Claims, 10 Drawing Sheets

OTHER PUBLICATIONS

H.V. Leong et al., "Data Broadcasting Strategies over Multiple Unreliable Wireless Channels," Proceedings of the 1995 ACM CIKM International Conference on Information and Knowledge Management, pp. 96–104, 1995.

N. Shivakumar et al., "Efficient Indexing for Broadcast Based Wireless Systems," Mobile Networks and Applications, pp. 433–446, 1996.

P. Xuan et al., "Broadcast on Demand: Efficient and Timely Dissemination of Data in Mobile Environments," Proceedings Third IEEE Real Time Technology and Applications Symposium, 11 pages, 1997.

R. Prakesh et al., "An Adaptive Casual Ordering Algorithm Suited to Mobile Computing Environments," Journal of Parallel and Distributed Computing, pp. 190–204, 1997.

S. Algar et al., "Reliable Broadcast in Mobile Wireless Networks," IEEE, pp. 236–240, 1995.

S. Acharya, "Dissemination–Based Data Delivery Using Broadcast Disks," IEEE Pers. Commun., vol. 2, No. 6, pp. 1–23, Dec. 1995.

S. Acharya et al., "Broadcast Disks: Data Management for Asymmetric Communication Environments," Proceedings of the ACM SIGMOD Conference, San Jose, CA, pp. 1–12, May 1995.

T. Imielinski et al., "Energy Efficient Indexing On Air," Department of Computer Science, Rutgers University, New Brunswick, NJ 08903, pp. 1–10.

* cited by examiner

Signature of the callback function
- callbackFunction(unsigned long GUDI, char *dataBuffer) — 702

Application Programming Interface
- DESInitialize()
- DESRegister(unsigned long *GUDIList, int count, PROC callbackFunction)
- DESSend(unsigned long *GUDIList, char *sendDataBuffer)
- DESReceive(unsigned long *GUDIList, char *receiveDataBuffer)
- DESTerminate();

METHOD AND APPARATUS FOR INTER-APPLICATION COMMUNICATION IN WIRELESS NETWORKS

FIELD OF THE INVENTION

The present invention relates to the field of inter-application communications and, in particular, to methods and apparatus for enabling inter-application communication for devices that interact using wireless networks.

BACKGROUND OF THE INVENTION

Figure 1A:
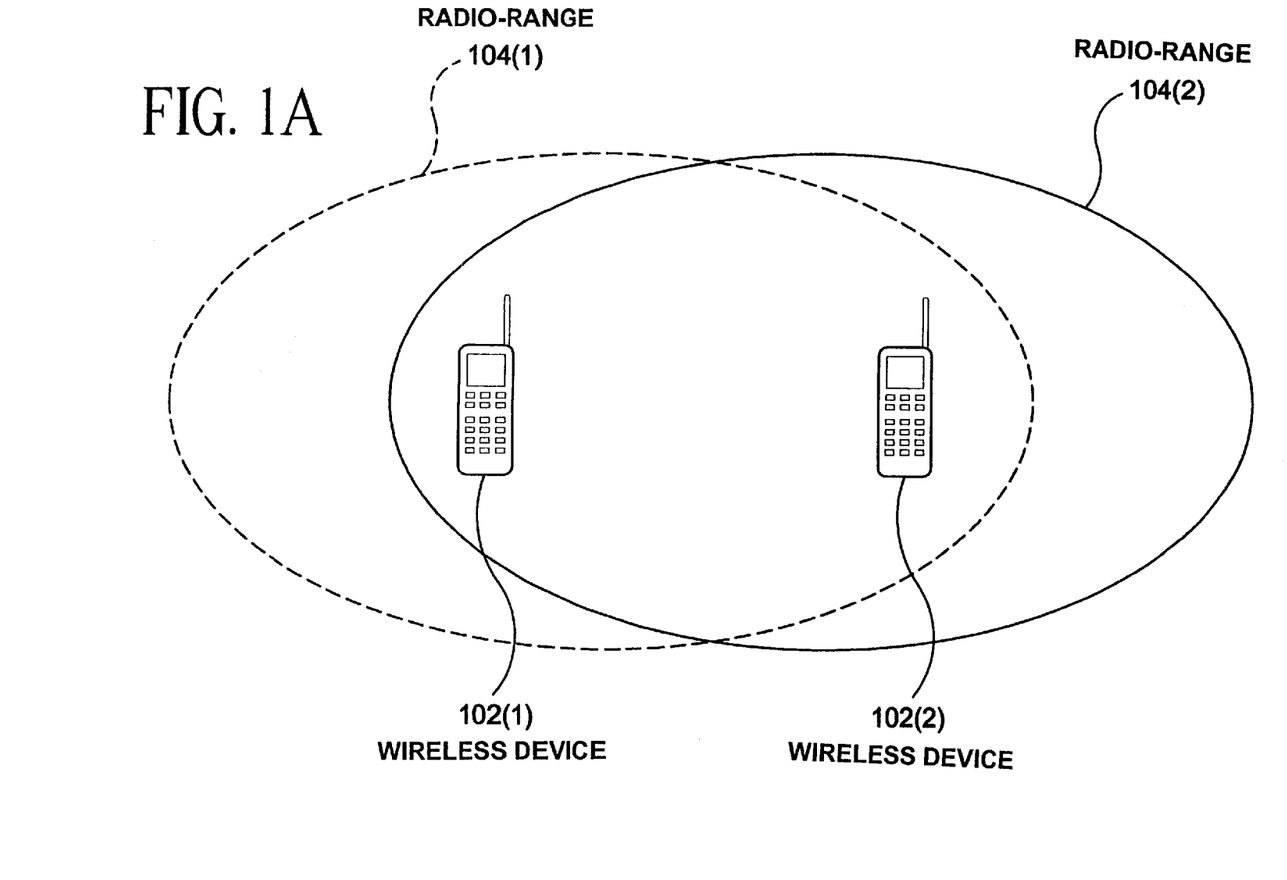
FIGS. 1A and 1B are diagrams illustrating the concept of radio-range in a wireless network.
Figure 1B:
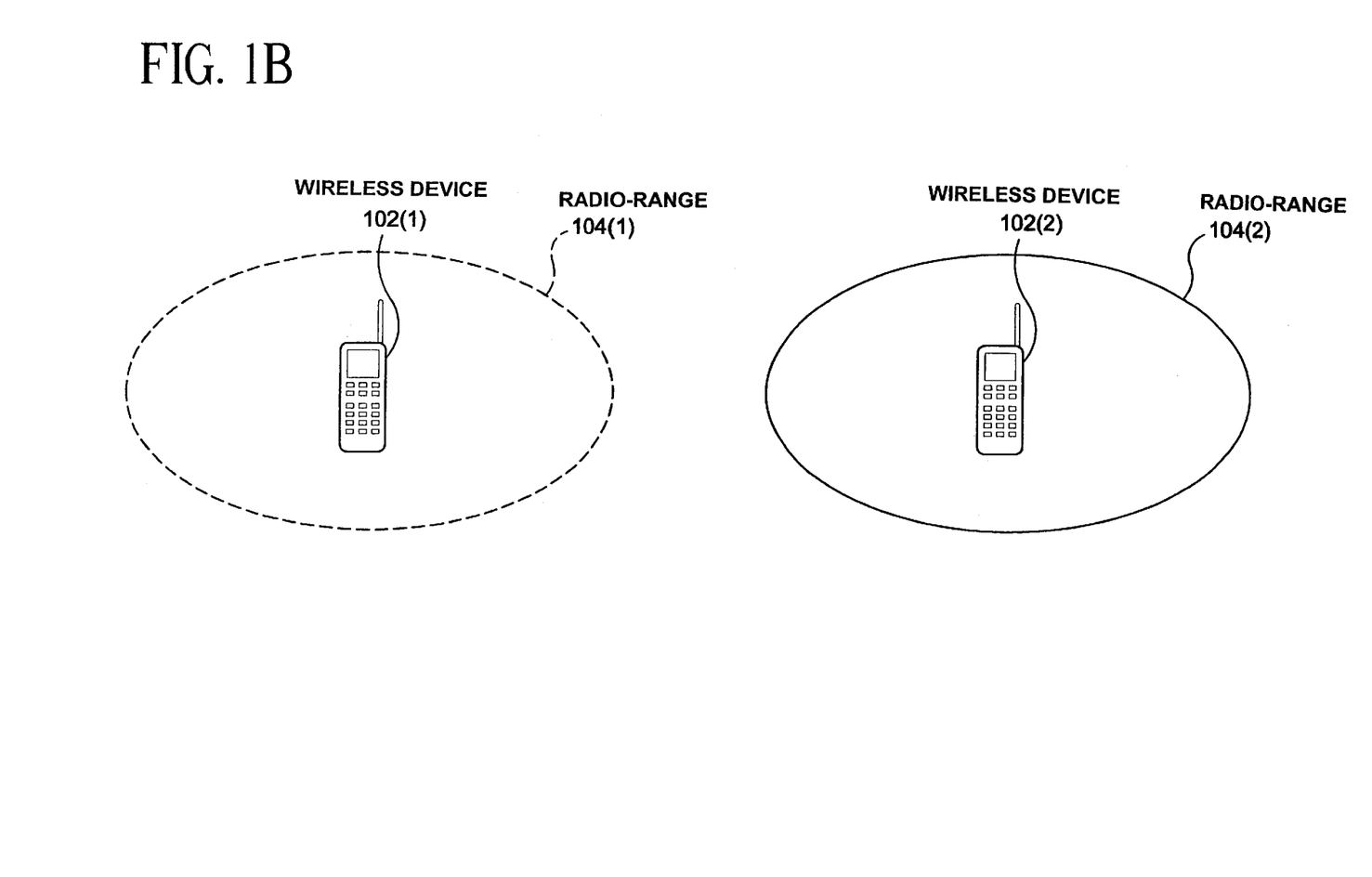

For the purposes of this disclosure, we define a wireless network as a mobile network, characterized by wireless links, lack of central infrastructure (such as Domain Name Service), and frequent host mobility (resulting in changes in communication. capability between devices). An example of a wireless network is a network that uses radio signals for communication. By its nature, the strength of a radio signal determines the range within which the signal can be received. We define this range as the "radio-range" for a transmitting device. In a radio-based wireless network, two devices are able to communicate with each other, provided they are tuned for communication (use the same frequency), by virtue of being within radio-range of each other. Two devices cease to communicate if either device moves outside the radio-range of the other device. The radio-range for a device is a function of the strength of the radio transmitter on individual devices. The range could vary from tens of feet (in Bluetooth enabled devices) to several hundred feet (in wireless LAN enabled devices) to tens of miles (in a broadcast by radio stations). It is possible to extend the radio-range of a device by installing repeater nodes in the wireless network. Repeater nodes rebroadcast the transmitted signal, thereby increasing the radio-range for a single transmitting device. For the purposes of embodiments of this disclosure, two devices, in a wireless network, can communicate with each other provided they are within radio-range of each other and use the same radio frequency. FIG. 1A shows an example where two devices 102 are within radio-range 104 of each other, and thus can communicate with each other. As the two devices move apart, they cease communication as soon as they move outside each others radio-range. This is illustrated in FIG. 1B.

Conventional inter-application communication paradigms either involve direct communication in which the communicating applications are directly aware of each other, or mediated communication in which the communicating applications use a commonly known and accessible mediator.

Figure 2:
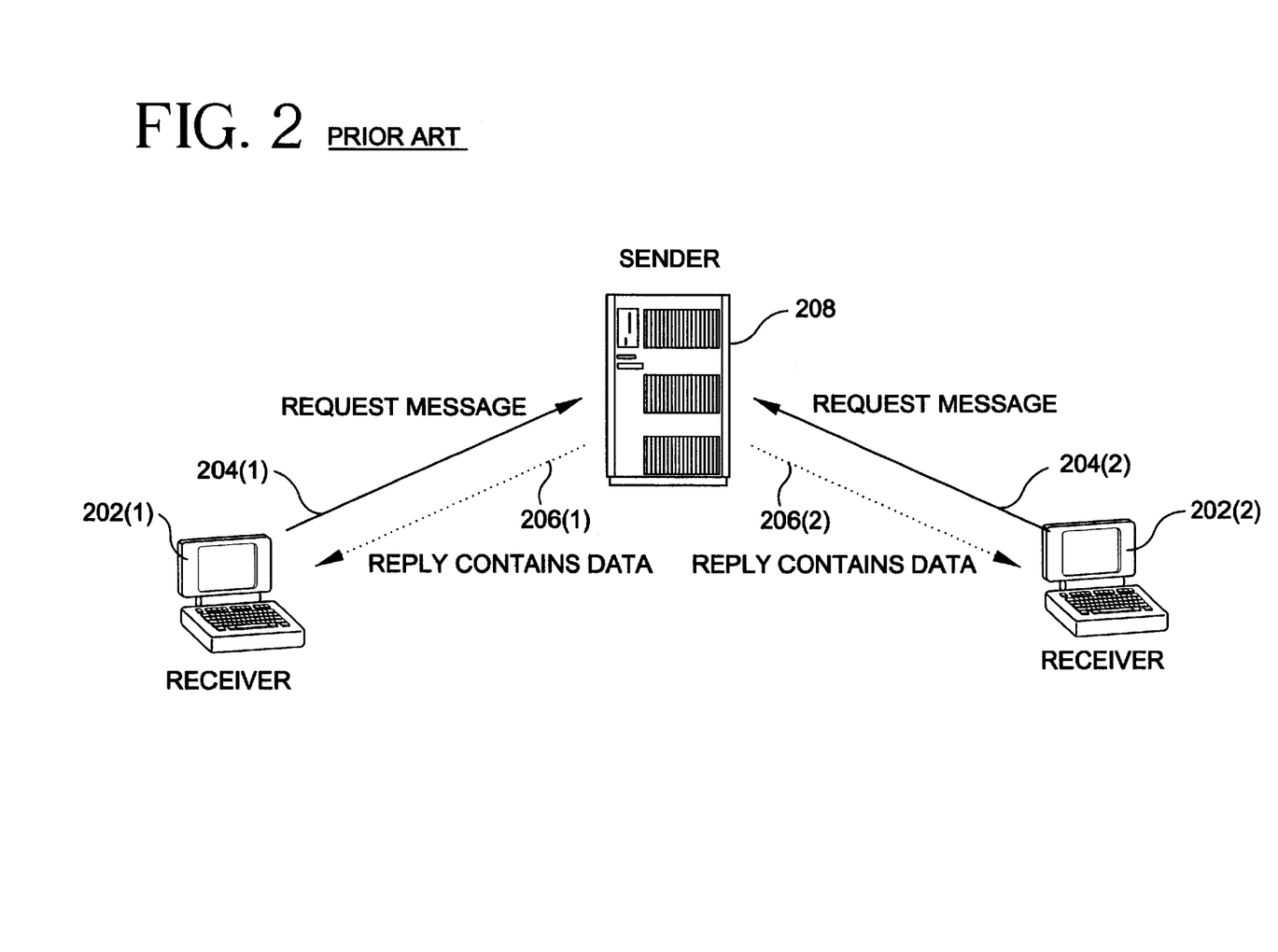
FIG. 2 is a diagram illustrating a receiver "pull" paradigm of direct communication.

One flavor of direct communication is where a receiver "pulls" the data from a sender (e.g., Web browsing). Here, a receiver is explicitly aware of the sender and communicates with the sender using a well-known network name or address. Such a receiver "pull" model of direct communication is shown in FIG. 2. In this paradigm, each application on the receiver 202 that is interested in receiving data from a sender 208, sends a request message 204 to a particular port at the sender. The request message header identifies the type of the request along with the identity of the data (if any). The application at the sender processes the request and sends the requested data back as part of the reply 206 to the receiver application. The main weakness of this paradigm, when applied to wireless networks, is that each application on the receiver needs to know the location and address of the application at the sender.

Figure 3A:
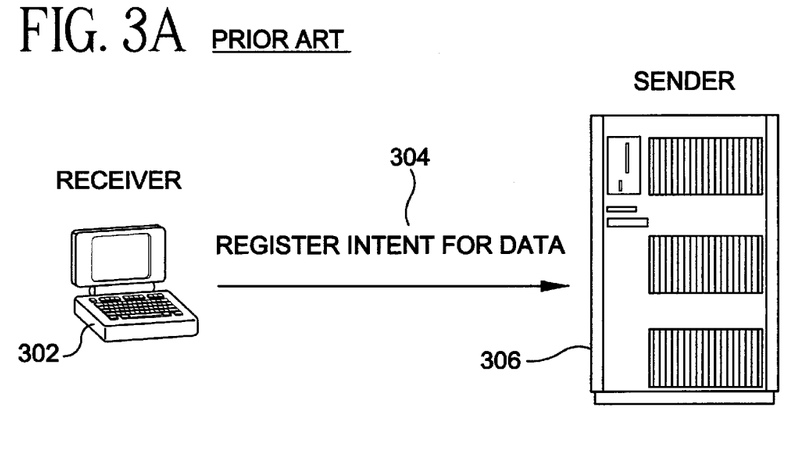
FIGS. 3A and 3B are diagrams illustrating a sender "push" paradigm of direct communication.
Figure 3B:
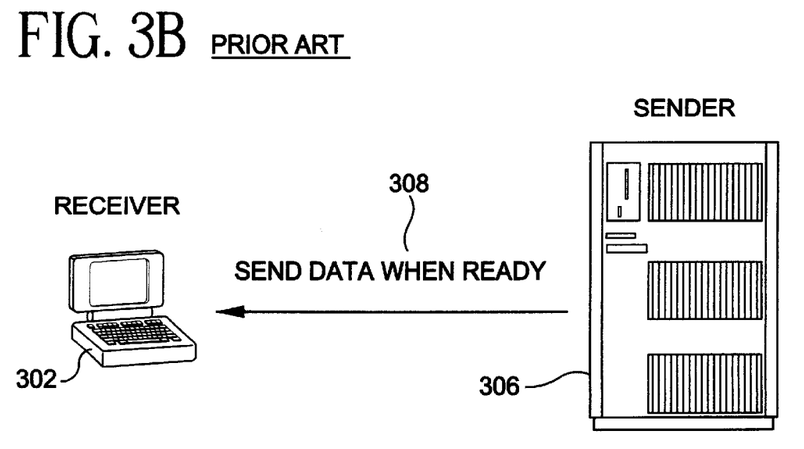

Another flavor of direct communication is where a receiver first "registers" its intent to receive data items with a sender. Such a receiver "push" model of direct communication is shown in FIGS. 3A and 3B. During the registration phase (FIG. 3A), a receiver 302 informs the sender 306 about the type of data that it would like to receive (registration step 304). As and when the data becomes available, during the reply phase (FIG. 3B), the sender 306 "pushes" the data (step 308) to the receiver (e.g., Marimba channels—http://www.marimba.com; PointCast—http://www.pointcast.com). The main weakness of this approach, when applied to wireless networks, is that both the sender and receiver need to be aware of each other's location either by means of a network name or network address where they can send-to or receive-from.

An alternate means of direct communication proposed in the literature is based on the technique called Broadcast Disks (described in "Broadcast Disks: Data Management for Asymmetric Communication Environments" by S. Acharya, R. Alonso, M. Franklin and S. Zdonik, In Proceedings of ACM SIGMOD Conference, May 1995). This technique augments the memory hierarchy of clients in asymmetric communication environments by broadcasting data from a fixed server to clients with less powerful machines (who could be mobile). Clients interested in seeking data items missing in their local storage retrieve data from the broadcast channel when the data "goes by." As the technique is intended primarily for information dissemination from a single source, its main weakness is that it does not support fine-grained arbitrary inter-application communication among mobile clients.

Mediated communications are used in tuple-based systems (e.g., Linda tuples as described in "Generative Communication in Linda," David Gelernter, ACM Transactions on Programming Languages and Systems, Vol. 7, No. 1, Jan. 1985, pp. 80–112, and "Distributed Communication via Global Buffer," David Gelernter and A. J. Bernstein, In Proceedings of the ACM Principles of Distributed Computing Conference, 1982, pp. 10–18; JavaSpaces as described in "JavaSpaces Specification," http://java.sun.com/products/javaspaces/specs/is.pdf, Sun Microsystems, Jul., 1998; and TSPaces as described in "TSpaces," P. Wycoff, S. W. McLaugry, T. J. Lehman, D. A. Ford, The IBM Systems Journal, August 1998), or queue-based systems (e.g., MQSeries as described in "MQSeries," http://www.software.ibm.com/mqseries, IBM). In these systems, two applications can communicate by depositing and withdrawing tagged data values in a tuplespace or a queue, without being explicitly aware of each other.

Figure 4:
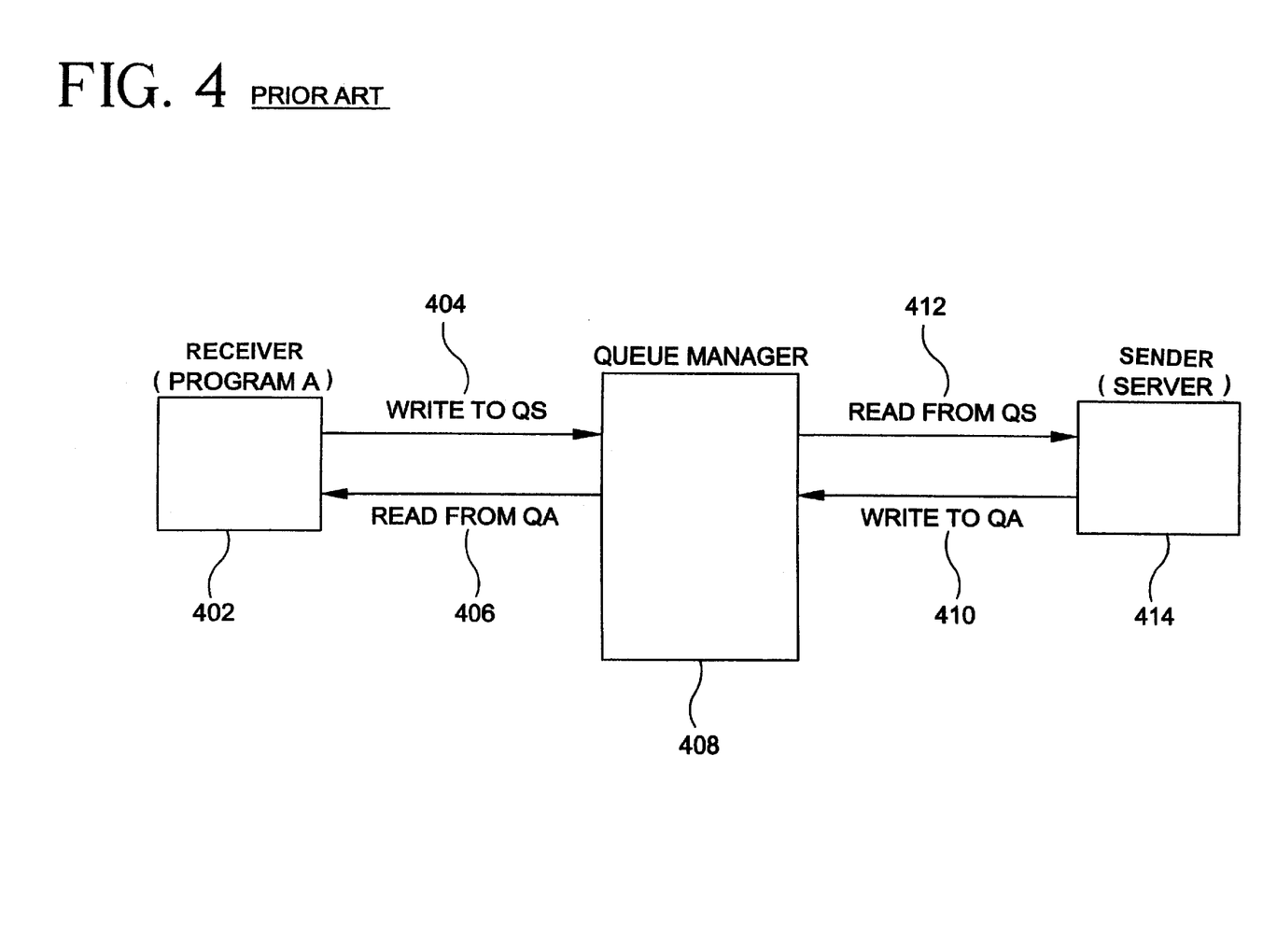
FIG. 4 is a diagram illustrating a mediated model of communication between applications.

FIG. 4 shows an example of a queue-based model of mediated communication. The receiver 402 writes the request message to a queue (step 404) with the Queue Manager 408. The sender 414 retrieves the request message from the queue (step 412). After processing the request, the sender writes the reply message (step 410) to a queue with the Queue Manager. The receiver then reads the reply message from the queue (step 406). The realization of a tuplespace or a queue is achieved by a third entity. This entity is independent of the communicating applications. The main weakness of this approach is that it relies on the constant presence of mediator (e.g., Queue Manager). If, for some reason, the mediator node disappears or fails, two applications cannot continue to communicate. The availability and accessibility of a mediating third party is unlikely in wireless networks which form (when devices come within communication range of each other) and dissolve dynamically (when devices move away).

SUMMARY OF THE INVENTION

This present invention combines the broadcast capabilities of the wireless networks with uniquely tagged data items to achieve ad-hoc inter-application communication without the above burdensome requirements set forth by conventional inter-application communication paradigms. That is, a sender of data items does not need to be aware of the presence of the recipients of the data items. Similarly, the recipient does not need to be aware of the presence of the sender. In this invention, the sender of a data item tags the data item with an identifier that is unique in the context of the intended communication, and then broadcasts the tagged data item in the wireless network. An application that intends to receive the data item, accepts the data item if the attached tag matches the tag expected by the receiving application. Therefore, two (or more) applications communicate simply by being in radio-range (physical proximity) of each other and agreeing on tag values. There are numerous means in which the sender and receiver applications can agree on the tag values. By way of example only,.tag values for data items can either be preconfigured within the applications, or can be communicated out-of-band to users of the applications. For instance, an application, which displays stock quotes only, can be hardwired to process stock quote tags only. A more customizable application can ask a user to enter data tag values that the application should process. Information about types of available tags can be communicated to the user using out-of-band means such as a user's manual or advertisement. However, it is to be appreciated that the invention is not limited to any particular tag value agreeing means.

It is to be appreciated that the term "application" refers generally to one or more software programs written to perform or provide one or more particular functions. The applications may range from accomplishing simple functions to complex functions. However, the methodologies of the present invention are not limited to any specific application and, in fact, may be applicable to simple communication, of data or some other signal transfer between two devices in a network.

Advantageously, in accordance with the present invention, communicating applications no longer need to be directly aware of each other's presence, for example, in the form of a predetermined address, nor do they need to use a common mediator.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative wireless network. However, it is to be understood that the present invention is not limited to any particular wireless network implementation. Rather, the invention is more generally applicable to any network in which it is desirable for applications to communicate without being directly aware of each other, e.g., in the form of a predetermined address, and to communicate without the need to use a common mediator.

Figure 5:
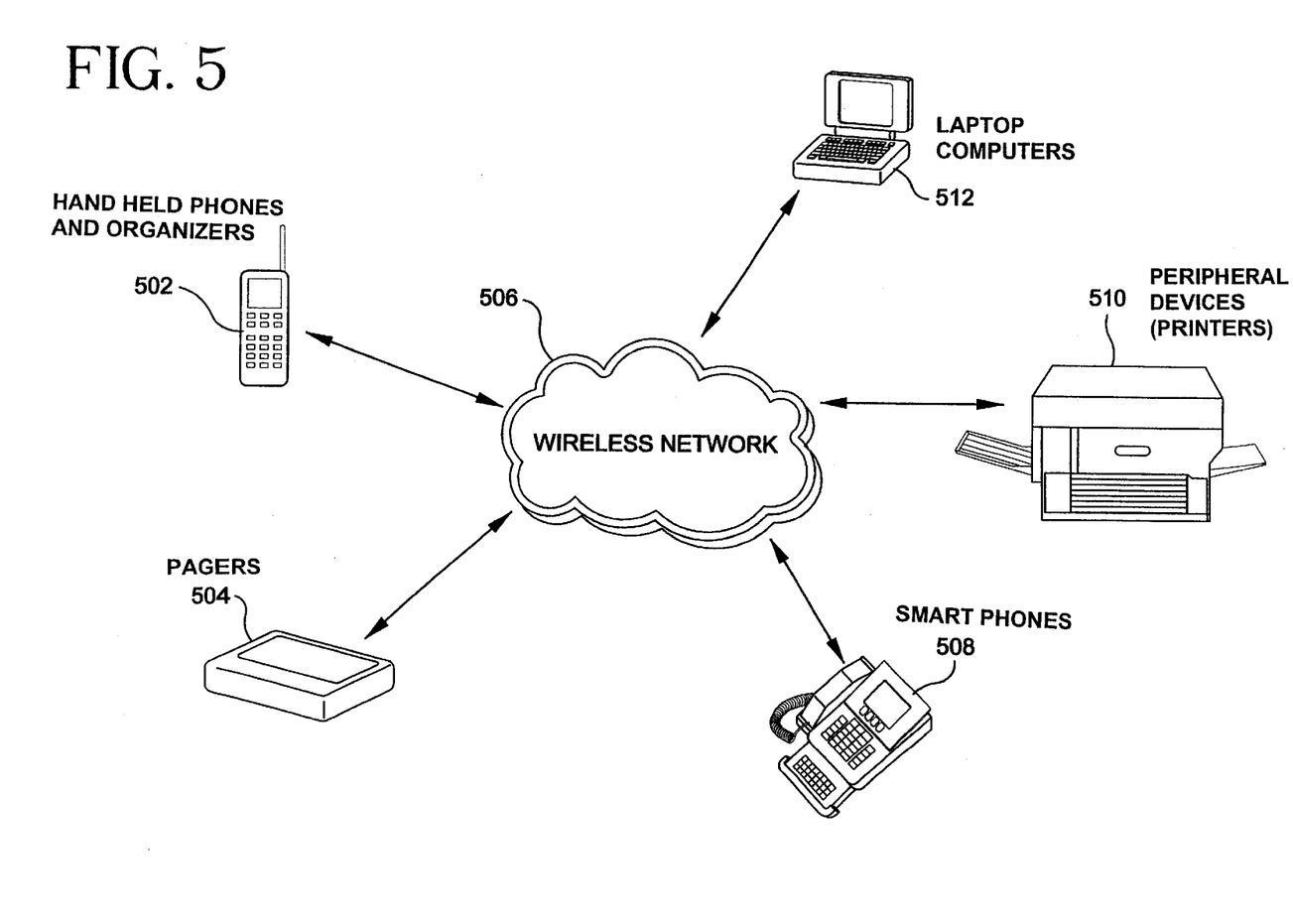
FIG. 5 is a diagram illustrating an exemplary system environment to which the present invention is applicable.

Referring now to FIG. 5, an exemplary system environment to which the present invention is applicable is shown. The environment comprises computing devices, such as laptop computers 512, hand held phones and organizers 502, smart phones 508, pagers 504 and peripheral devices, such as printers 510, etc. Each device is capable of communicating with another device using wireless media. To this end, each device is comprised of a wireless transmitter and a wireless receiver. Two devices communicate when they are within radio-range of each other, as illustrated in FIG. 1A. Communication is established after two devices come within radio-range and establish a network to facilitate communication. The several devices may communicate with each other over a network 506, as long as they are within radio-range of each other. The network 506 may be any network suitable to permit communication between the devices. The invention is not limited to any particular network implementation. In this embodiment, the primary mode of communication is broadcast, i.e., when a device wants to transmit information, it broadcasts the contents of the information using its wireless transmitter. Any other device that is within the receiving range of the broadcast is capable of receiving this transmission. This implies that the sender is not aware of who the receiver is, and the receiver is not aware of who the sender is.

It is to be appreciated that each device shown in FIG. 5 may comprise a processor operatively coupled to memory and I/O devices. It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, microphone, etc., for inputting data to the processing unit, and/or one or more output devices, e.g., CRT display, a speaker, etc., for presenting results associated with the processing unit. It is also to be understood that "processor" may refer to more than one processing device and that various elements associated with a processing device may be shared by other processing devices. Accordingly, software components or modules including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 6:
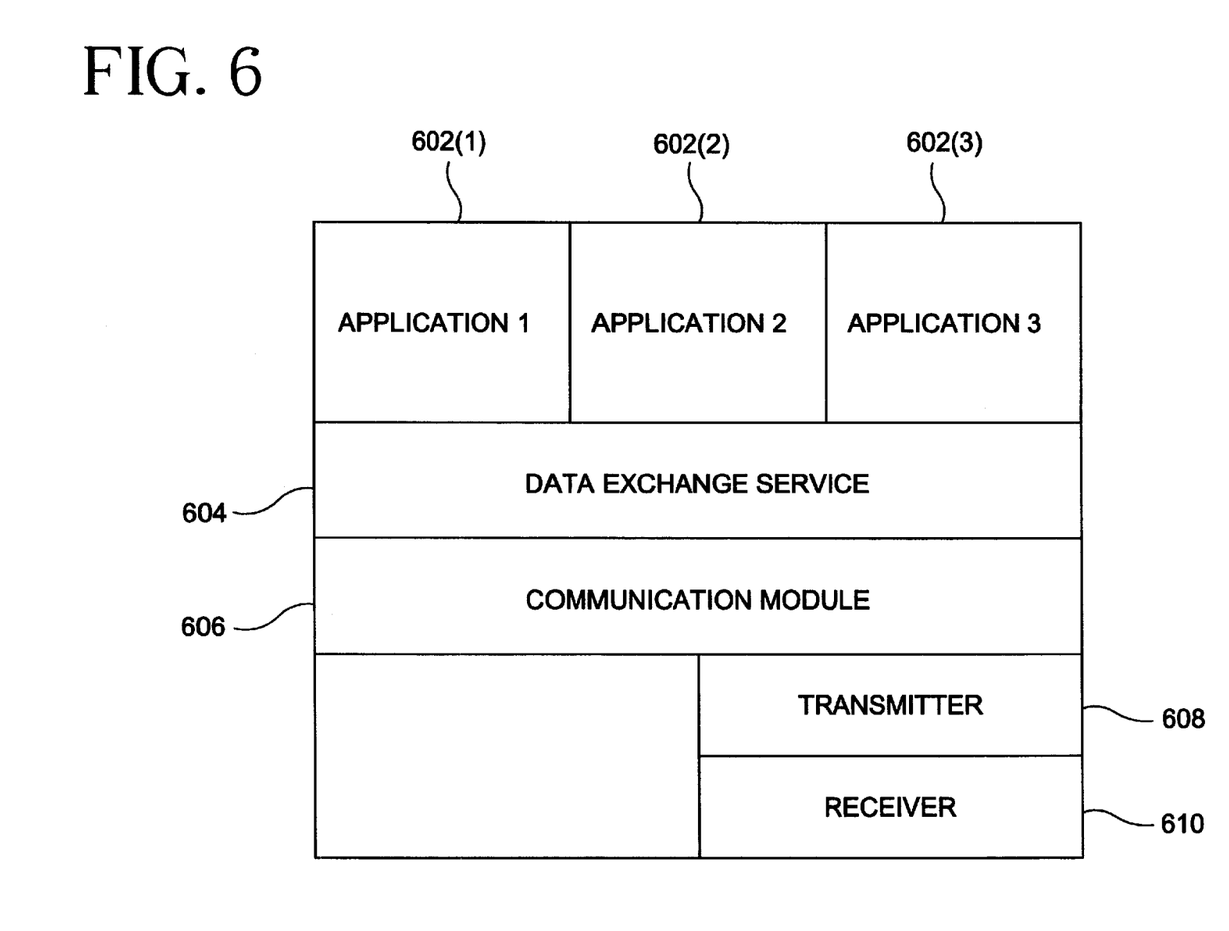
FIG. 6 is a block diagram illustrating an exemplary software architecture of a device in a wireless network employing inter-application communication methodologies of the present invention.
Figure 7:
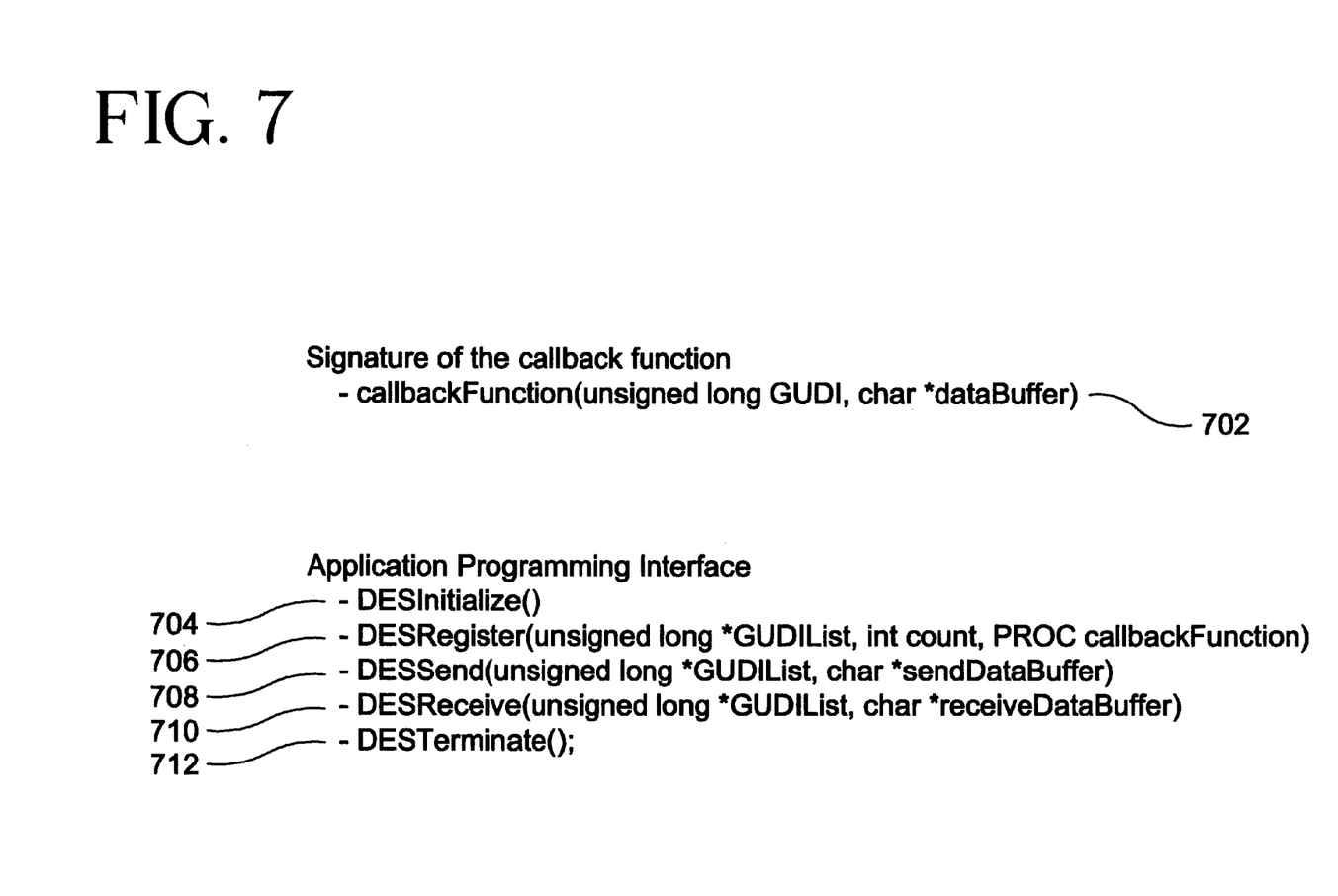
FIG. 7 is a diagram illustrating an application programming interface exported by a Data Exchange Service of a device in a wireless network employing inter-application communication methodologies of the present invention.

Referring now to FIG. 6, an exemplary software stack associated with each device in the wireless network is shown. Each device is equipped with a wireless transmitter 608 and a receiver 610. The transmitter 608 sends out radio signals on a specific frequency used by the network while the receiver 610 listens to a specific frequency to receive data from other devices (we assume that the two devices would use the same frequency hopping scheme to maintain communication). The transmitter and the receiver are used by the communication module 606 for sending and receiving data. The communication module 606 provides functions to a software module called the Data Exchange Service (DES) 604 for sending and receiving messages using the transmitter and receiver. The DES module resides above the communication layer. The DES module provides an application programming interface (API) to the applications for sending and receiving data using the mechanisms described herein. The APIs are shown in FIG. 7. The applications written for the device (602), use the DES APIs for communicating with other applications executing on other devices.

The present invention introduces the concept of using a Globally Unique Data Identifier (GUDI) in the context of inter-application communication. A GUDI is a 128-bit globally unique identifier, as described in Microsoft Visual C++ Software Development Kit (available from Microsoft Corporation, Redmond, Wash.). For example, 12345678-1234-1234-123456789ABC is a syntactically correct GUDI. A GUDI is generated using a combination of current date and time, current clock sequence, a forcibly incremented counter value, and a machine (device) identifier. A GUDI represents a particular class of data values or a single data value. In accordance with the invention, it is used to tag all data items that are exchanged during inter-application communication.

FIG. 7 shows the programming interface that the DES module exports to the applications. Before using the DES module, the application initializes the module using the DESInitialize( ) function 704. Each application can choose to either receive communications from other applications asynchronously or synchronously. To receive asynchronous communications from other applications, an application uses the DESRegister( ) function 706. The function takes as argument a list of GUDIs and a pointer to the callback function that the application has implemented. The signature of the callback function 702 is shown in FIG. 7. To send a data item to other applications, an application uses the DESSend( ) function 708. The function takes as argument a list of GUDIs and a pointer to the buffer that the application wishes to transmit. The list of GUDIs is used by the DES runtime to tag data items before transmission. An application can also choose to synchronously receive data from other applications using the DESReceive( ) function 710. The DESReceive function blocks (waits) until a data item that matches the GUDI specified in the function is available. An application decides whether to receive data synchronously or asynchronously. An application can terminate receipt of data in the future by calling the DESTerminate( ) function 712. Subsequent to the DESTerminate call, no more data items are delivered to the application.

Figure 8:
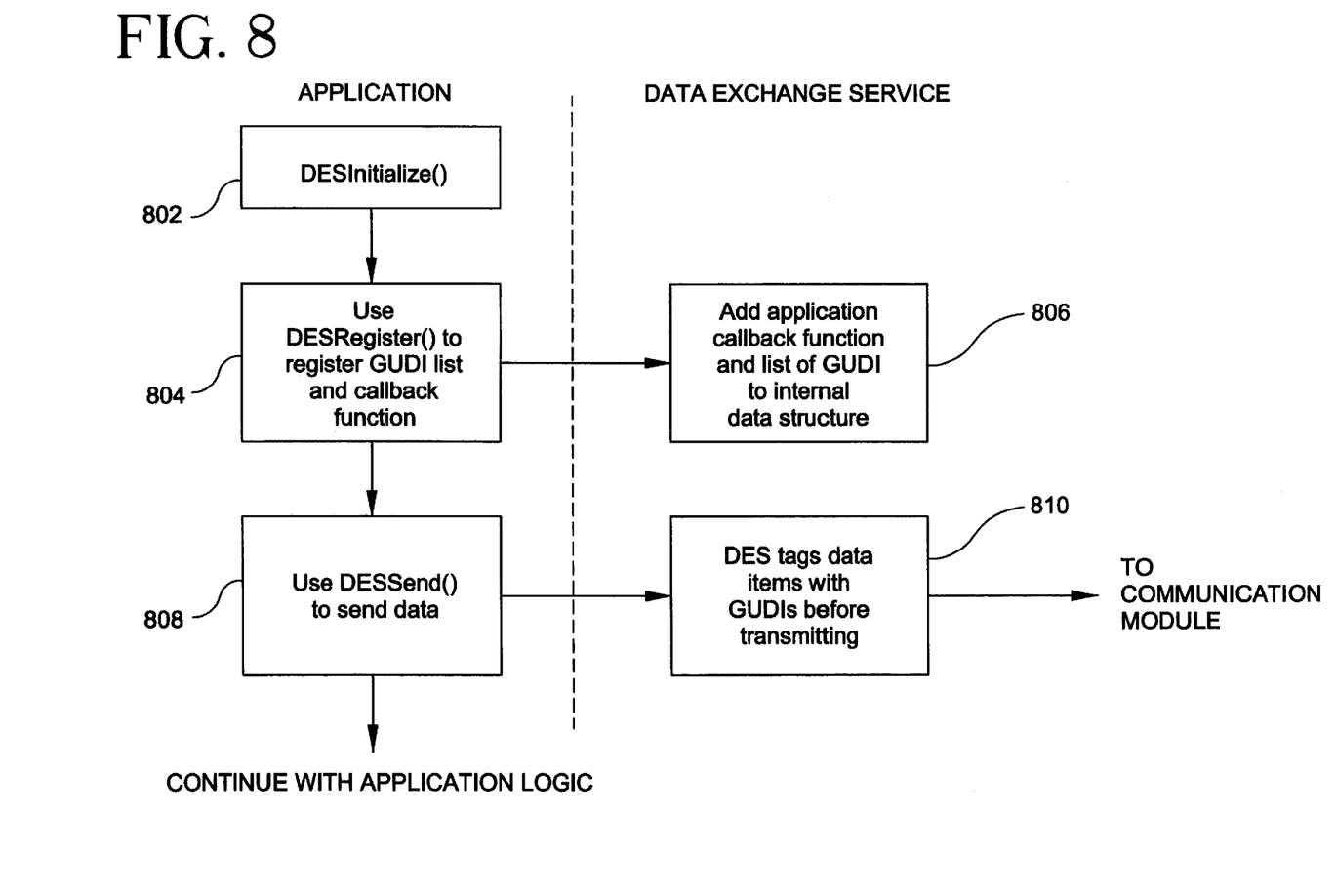
FIG. 8 is a flow diagram illustrating steps performed by an application to send data according to an embodiment of the present invention.

Referring now to FIG. 8, a flow diagram is shown of steps performed by an application to employ inter-application communication according to an embodiment of the present invention. At the time of initialization, the application executes the DESInitialize( ) function (step 802). In step 804, the application registers a list of GUDIs that the application is interested in receiving data for. The application also registers a callback function with the DES module in step 806. The callback function is used by DES to notify the application when a data item with that GUDI is received. In response to the registration process of step 806, the DES module stores a list of GUDIs and the application callback handle in its internal data structures. An application can send data to other applications using the DESSend( ) function in step 808. In step 810, the DES tags data items it wishes to broadcast with GUDIs specified by the application. The tagged data items are then transmitted into the network. The application may then continue with other application logic.

Figure 9:
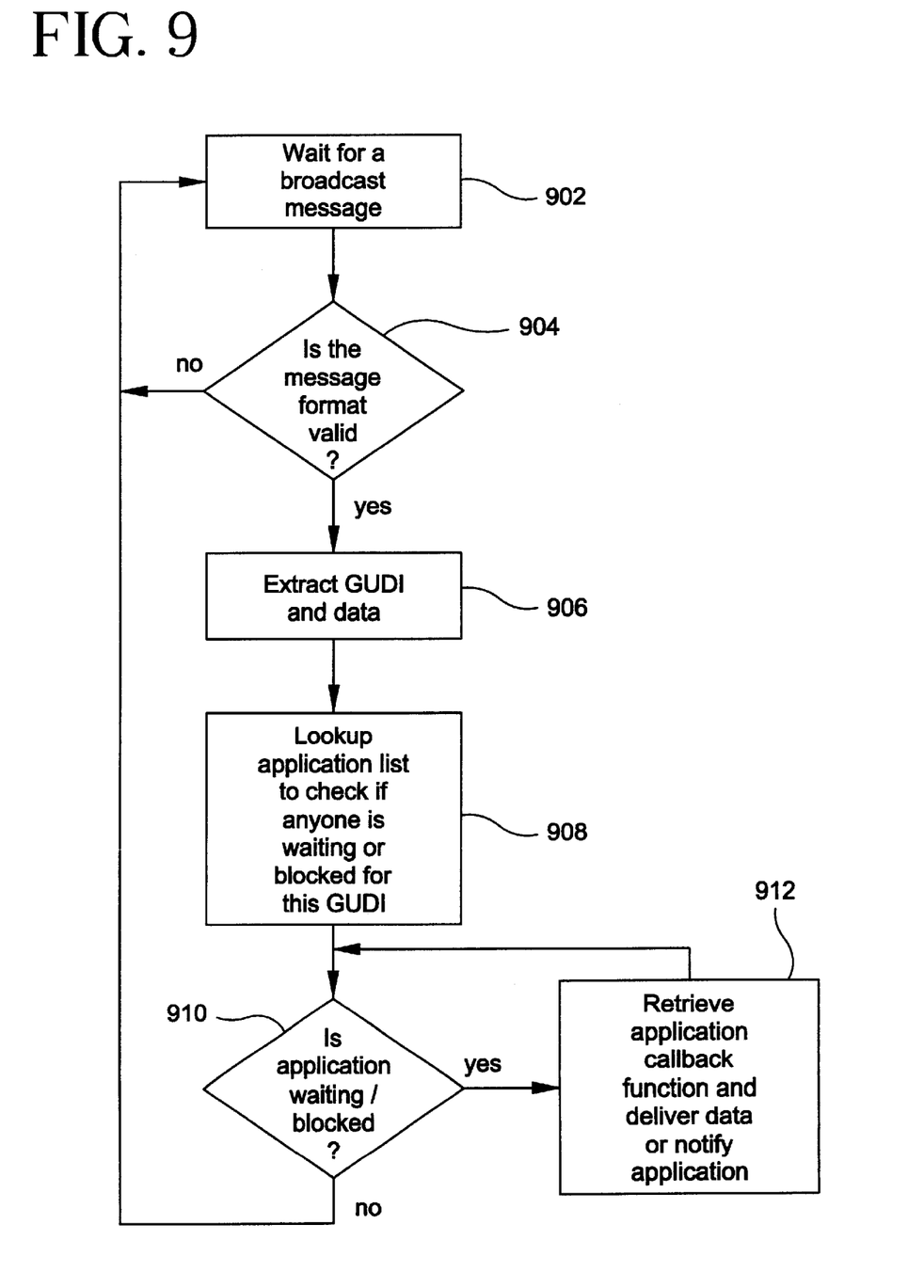
FIG. 9 is a flow diagram illustrating steps performed by a Data Exchange Service to process a broadcast message received by a device and delivered to an application according to an inter-application communication embodiment of the present invention.

Referring now to FIG. 9, a flow diagram is shown illustrating steps performed by a Data Exchange Service to process a GUDI broadcast message received by a device according to an inter-application communication embodiment of the present invention. The DES module waits to receive any broadcast messages in step 902. Upon receipt of a message, in step 904, it checks to see if the message is of valid format, i.e., contains a valid GUDI. If the message is not valid then DES resumes waiting for more messages, i.e., returns to step 902. If the message is of valid format, in step 906, DES extracts the GUDI and message content from the message. It then examines its internal data structures to identify any applications that are waiting or blocked for this GUDI in step 908. In step 910, if no applications are waiting or blocked then the message is dropped, and DES resumes waiting for new broadcast messages, i.e., returns to step 902. If an application is waiting, the DES module extracts the application callback handle and notifies the application about the message in step 912. All blocked applications are notified also. Upon successful delivery of the message to all waiting and blocked applications, DES resumes listening for more messages.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a sending device of providing inter-application communication between an application associated with the sending device and one or more applications associated with one or more other devices in a wireless network, the method comprising the steps of:

tagging a data item with an identifier unique to an intended communication between the application associated with the sending device and the one or more applications associated with the one or more other devices; and broadcasting the tagged data item in the wireless network for receipt by one or more applications associated with the one or more other devices in the wireless network located within a radio-range associated with the sending device, without specifying the identity of the one or more devices.

2. The method of claim 1, wherein the identifier is generated using at least one of a current date and time, a current clock sequence, an incremented counter value, and a device identifier.

3. The method of claim 1, wherein the tagging and broadcasting operations are performed by an application associated with the sending device in accordance with an application programming interface.

4. A method for use in a receiving device of providing inter-application communication between an application associated with the receiving device and one or more applications associated with one or more other devices in a wireless network, the method comprising the steps of:

receiving a broadcast data item when the receiving device is within a radio-range of a device that sent the data item, without specifying the identity of the sending device, the data item being tagged with an identifier not specifying the identity of the receiving device, but unique to an intended communication between an application associated with the sending device and one or more applications associated with one or more other devices in the wireless network; and accepting the data item for processing when the identifier substantially matches an identifier expected by the application associated with the receiving device.

5. The method of claim 4, wherein the identifier is generated using at least one of a current date and time, a current clock sequence, an incremented counter value, and a device identifier.

6. The method of claim 4, wherein the receiving and accepting operations are performed by the application in accordance with an application programming interface.

7. The method of claim 4, further comprising the step of, prior to receiving a broadcast data item, registering one or more identifiers for which the receiving device desires to receive one or more data items.

8. The method of claim 7, wherein the accepting operation comprises matching the identifier of the received data item with the one or more registered identifiers to determine if the data item is one which the receiving device desires to receive.

9. A method for providing inter-application communication between an application associated with a sending device and one or more applications associated with one or more receiving devices in a wireless network, the method comprising the steps of:

at the sending device, tagging a data item with an identifier unique to an intended communication between the application associated with the sending device and the one or more applications associated with the one or more receiving devices;

at the sending device, broadcasting the tagged data item in the wireless network;

at a receiving device, receiving the broadcast data item when the receiving device is within a radio-range of the sending device; and at a receiving device, accepting the data item for processing when the identifier substantially matches an identifier expected by an application associated with the receiving device;

wherein the identity of the sending device and the receiving device are not specified by the data item.

10. Apparatus for providing inter-application communication between applications associated with one or more devices in a wireless network, the apparatus comprising:

a sending device operative to: (i) tag a data item with an identifier unique to an intended communication between an application associated with the sending device and the one or more applications associated with one or more other devices; and (ii) broadcast the tagged data item in the wireless network for receipt by one or more applications associated with one or more other devices in the wireless network located within a radio-range associated with the sending device, without specifying the identity of the one or more devices.

11. The apparatus of claim 10, wherein the identifier is generated using at least one of a current date and time, a current clock sequence, an incremented counter value, and a device identifier.

12. The apparatus of claim 10, wherein the tagging and broadcasting operations are performed by an application associated with the sending device in accordance with an application programming interface.

13. Apparatus for providing inter-application communication between applications associated with one or more devices in a wireless network, the apparatus comprising:

a receiving device operative to: (i) receive a broadcast data item when the receiving device is within a radio-range of a device that sent the data item, without specifying the identity of the sending device, the data item being tagged with an identifier not specifying the identity of the receiving device, but unique to an intended communication between an application associated with the sending device and one or more applications associated with one or more other devices in the wireless network; and (ii) accept the data item for processing when the identifier substantially matches an identifier expected by an application associated with the receiving device.

14. The apparatus of claim 13, wherein the identifier is generated using at least one of a current date and time, a current clock sequence, an incremented counter value, and a device identifier.

15. The apparatus of claim 13, wherein the receiving and accepting operations are performed by the application in accordance with an application programming interface.

16. The apparatus of claim 13, further comprising the operation of, prior to receiving a broadcast data item, registering one or more identifiers for which the receiving device desires to receive one or more data items.

17. The apparatus of claim 16, wherein the accepting operation comprises matching the identifier of the received data item with the one or more registered identifiers to determine if the data item is one which the receiving device desires to receive.

18. An article of manufacture for use in a sending device for providing inter-application communication between an application associated with the sending device and one or more applications associated with one or more other devices in a wireless network, comprising a machine readable medium containing one or more programs which when executed implement the steps of:

tagging a data item with an identifier unique to an intended communication between the application associated with the sending device and the one or more applications associated with the one or more other devices; and broadcasting the tagged data item in the wireless network for receipt by one or more applications associated with one or more other devices in the wireless network located within a radio-range associated with the sending device, without specifying the identity of the one or more devices.

19. An article of manufacture for use in a receiving device for providing inter-application communication between an application associated with the receiving device and one or more applications associated with one or more other devices in a wireless network, comprising a machine readable medium containing one or more programs which when executed implement the steps of:

receiving a broadcast data item when the receiving device is within a radio-range of a device that sent the data item, without specifying the identity of the sending device, the data item being tagged with an identifier not specifying the identity of the receiving device, but unique to an intended communication between an application associated with the sending device and one or more applications associated with one or more other devices in the wireless network; and accepting the data item for processing when the identifier substantially matches an identifier expected by the application associated with the receiving device.

* * * * *